March 19, 1968     O. M. KIEL ET AL     3,373,815
FRACTURING OF SUBTERRANEAN FORMATIONS
Filed May 6, 1966
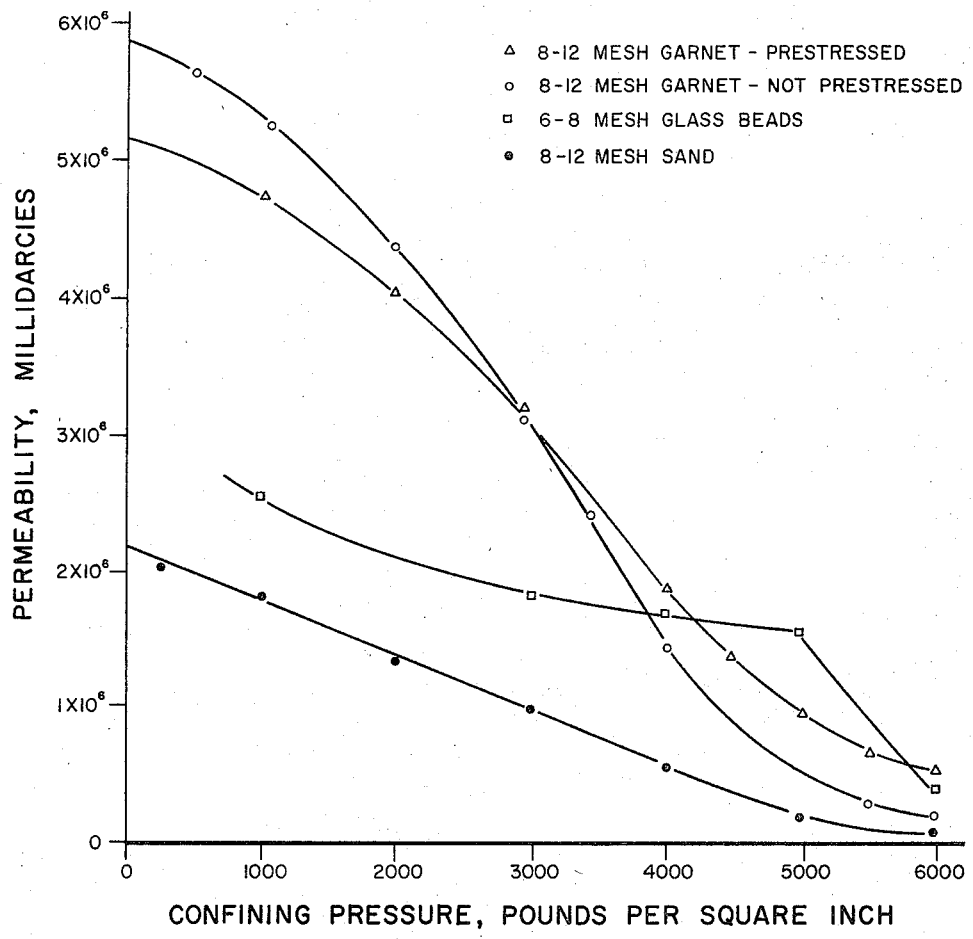
OTHAR M. KIEL &  *INVENTORS*
ALBERT L. KIDWELL
*BY*
*ATTORNEY*

3,373,815
FRACTURING OF SUBTERRANEAN FORMATIONS
Othar M. Kiel and Albert L. Kidwell, Houston, Tex., assignors to Esso Production Research Company, a corporation of Delaware
Filed May 6, 1966, Ser. No. 548,250
10 Claims. (Cl. 166—42)

This invention relates to the fracturing of subterranean formations and is particularly concerned with the propping of fractured formations to obtain high conductivities.

The hydraulic fracturing operations employed in the petroleum industry generally involve the injection of an aqueous solution, a hydrocarbon oil or an oil-water emulsion containing rounded quartz sand grains into a well under sufficient pressure to break down the exposed formation. The suspended sand particles are carried into the induced fracture with the fluid and, when the pressure is later reduced, act as a propping agent to prevent complete closure of the fracture. This results in the formation of a permeable sand pack which serves as a channel through which injected or produced fluids may pass. The conductivity of this channel depends upon the width of the fracture and the permeability of the sand in place. The 20–40 mesh sand generally used has a permeability of about 120 darcies at moderate confining pressures. Since the width of the packed fracture may be quite small, the fracture conductivity is normally low. This limited conductivity has largely restricted the incentives for fracturing oil and gas reservoirs to formations which have been damaged or have low native permeabilites.

In accordance with the present invention, it has now been found that fractures with surprisingly high conductivities can be obtained by using certain naturally-occurring crystals as propping agents. Studies have shown that the use of garnet, corundum, zircon, rutile, high temperature quartz and other minerals which have Mohs' hardness values of about 6 or greater and weather out as individual crystals of about 40 mesh or larger results in permeabilities significantly higher than those obtained with ordinary quartz sand, metallic shot, glass beads, plastic particles, walnut hulls and similar materials employed as propping agents in the past. These higher permeabilities and the corresponding greater conductivities provide incentives for the fracturing of formations that have not been considered candidates for fracturing with techniques available in the past.

The nature and objects of the invention can be better understood from the following detailed description of the materials employed as propping agents in accordance therewith and the accompanying drawing showing the results of tests of such materials.

The crystals employed for purposes of the invention occur as accessory minerals in igneous and metamorphic rocks, particularly in scists and gneisses, and are sometimes referred to as automorphic minerals or metacrists. In the parent rock such minerals are bounded by their own crystalline faces and hence weather out as relatively large, well defined individual crystals. The weathered out crystals are often found in soil and alluvial beds and may be somewhat rounded due to erosion and abrasion during the deposition process. Roughly equidimensional crystals on which a majority of the crystalline faces can still be seen are preferred.

A variety of different minerals occur in the form of crystals suitable for purposes of the invention. These include minerals of the garnet group such as pyrope, almandite, spessartite, grossularite, andradite and uvarovite. Corundum, rutile, zircon, high temperature quartz and similar materials which are essentially inert to the formation fluids and have Mohs' hardness values of about 6 or greater are also suitable. The high temperature quartz crystals can be readily distinguished from the quartz sand used in the past in that the latter is made up of polycrystalline grains rather than individual crystals. It will be understood that these materials vary in abundance and that some are therefore more expensive than others. Garnet crystals are generally available at relatively low cost and hence their use is normally preferred. Almandite crystals have been found particularly effective.

The size of the crystals selected for purposes of the invention will generally fall between about 2½ and about 40 mesh, preferably between about 4 and about 20 mesh, on the U.S. Standard Sieve Series scale. It is preferred to utilize large crystals within a relatively narrow size range where possible. The size range chosen will depend in part, of course, on the density of the mineral making up the crystals and the viscosity of the fracturing fluid employed and may be varied as necessary to permit proper suspension of the crystals. Crystals of about 4 to 6 mesh, 6 to 8 mesh, 8 to 12 mesh, or 10 to 12 mesh will generally be used.

The individual crystals of garnet or similar material utilized in accordance with the invention give significantly higher permeability values than the quartz sand, glass beads and other materals employed as propping agents in the past. This is demonstrated by the results of permeability tests of 8–12 mesh almandite crystals, 8–12 mesh quartz sand, and 6–8 mesh high strength glass beads under various confining loads. These tests were carried out by first splitting a core of hard, well consolidated limestone 3½ inches in diameter and 5 inches long. The two halves of the core were mounted in a rubber sleeve with spacers between them to form a simulated fracture 0.25 inch in width. The propping agent to be tested was poured into the fracture and tamped in place. After the fracture had been packed in this manner, the spacers were removed. The prepared core was then placed in a pressure cell connected to a manually operated pump for applying a confining pressure to the outer surface of the sleeve. A refined oil with a viscosity of 135 centipoises was pumped through the core at a constant rate of about 1 cubic centimeter per second and the pressure drop across the 5 inch long fracture was measured by means of a mercury manometer. Runs were made in this manner at confining pressures of from 500 to 6000 lbs. per square inch with each of the three propping agents. The calculated permeability values obtained in these tests are shown in the drawing.

It can be seen from the lowermost curve in the drawing that the 8–12 mesh quartz sand had an initial permeability of about 2 million millidarcies at a confining pressure of 500 lbs. per square inch. This decreased to a permeability of about 100,000 millidarcies at a confining pressure of 6000 lbs. per square inch. This reduction in permeability is due in part to compaction of the sand grains and is partially attributable to crushing of the sand and the formation of fines which plug the pore spaces between adjacent grains. The permeability values obtained are similar to those for sand reported in the literature.

The results obtained with glass beads were slightly better than those obtained with the sand tested earlier. The beads employed were considerably larger than the sand grains and thus the permeability values were somewhat higher. At an initial confining pressure of 1000 lbs. per square inch, the glass beads had a permeability of about 2.5 million millidarcies. This declined to about 1.6 million millidarcies at about 5000 lbs. per square inch. As the pressure was raised above 5000 lbs., many of the glass beads failed and the permeability declined to about 400,000 millidarcies at a pressure of 6000 lbs. per square inch. Above this pressure, the sand and glass beads both give very low permeabilities. If 8–12 mesh glass beads had been used used in place of the 6–8 mesh beads, the values obtained below about 5000 lbs. per square inch would have been considerably lower and would have approximated those obtained with the sand.

The uppermost curve in the drawing shows the results obtained with 8–12 mesh almandite crystals. As pointed out earlier, almandite is a form of garnet. The initial permeability obtained with this material at a pressure of 500 lbs. per square inch was about 5.6 million millidarcies. The garnet crystals showed a reduction in permeability with increasing pressure and in this respect were similar to both the sand and the glass beads. It should be noted, however, that the permeabilities obtained with the garnet were always greater than those obtained with sand of the same size and exceeded those obtained with the larger glass beads at pressures up to about 4000 lbs. per square inch. Because of these higher permeabilities, the garnet is superior to both the sand and glass beads at moderate confining pressures. Similar advantages are obtained with crystals of other minerals having Mohs' hardness values of about 6 or greater.

The drawing also shows the effect of prestressing the garnet crystals. It had been observed that certain crystals obtained from most sources contain flaws and are therefore weaker than others. By passing the crystals between high pressure rubber surfaced rolls or otherwise artificially prestressing them and then screening the product to eliminate fines, the defective crystals can be eliminated. This adds little to the cost of the propping agent and results in a superior product. The prestressed crystals referred to in the drawing were identical to the garnet crystals used in the earlier test except that they had been subjected to a confining pressure of about 6000 lbs. per square inch and then rescreened. As can be seen from the drawing, these prestressed crystals gave somewhat lower permeabilities than the native crystals at confining pressures up to about 3000 lbs. per square inch but gave better permeabilities at higher pressures. These higher permeabilities facilitate use of the propping agents at greater depths.

The improved propping agents of the invention can be employed in much the same way that conventional proppants are used. No special equipment or techniques are generally required. They are particularly useful in fracturing operations carried out with high viscosity hydrocarbon oils to obtain wide fractures. Because of the high permeabilities obtained for a given particle size, they permit the formation of fractures with considerably higher capacities than have generally been obtained heretofore.

What is claimed is:

1. In a method for propping open a fracture in a subterranean formation surrounding a wellbore, the improvement which comprises injecting into said fracture a fluid suspension of naturally-occurring individual crystals of a mineral which is essentially inert to the formation fluids and has a Mohs' hardness value of about 6 or greater, said crystals being between about 2½ and about 40 mesh on the U.S. Standard Sieve Series scale in size.
2. A method as defined by claim 1 wherein said crystals are crystals of a mineral from the garnet group.
3. A method as defined by claim 1 wherein said crystals are almandite crystals.
4. A method as defined by claim 1 wherein said crystals are between about 4 and about 20 mesh in size.
5. A method as defined by claim 1 wherein said crystals are corundum crystals.
6. A method as defined by claim 1 wherein said crystals are roughly equidimensional crystals on which a majority of the crystalline faces can still be seen.
7. A method as defined by claim 1 wherein said crystals are andradite crystals.
8. A method as defined by claim 1 wherein said crystals are artificially prestressed crystals.
9. A method as defined by claim 1 wherein said crystals are zircon crystals.
10. A method as defined by claim 1 wherein said crystals are rutile crystals.

References Cited
UNITED STATES PATENTS

| | | | |
|---|---|---|---|
| 2,699,212 | 1/1955 | Dismukes | 166—42 |
| 3,075,581 | 1/1963 | Kern | 166—42 |
| 3,217,801 | 11/1965 | Fast | 166—42 |

CHARLES E. O'CONNELL, *Primary Examiner.*

NILE C. BYERS, *Examiner.*